United States Patent
Bernstein

Patent Number: 5,915,023
Date of Patent: Jun. 22, 1999

[54] AUTOMATIC PORTABLE ACCOUNT CONTROLLER FOR REMOTELY ARRANGING FOR TRANSFER OF VALUE TO A RECIPIENT

[76] Inventor: Robert Bernstein, 3229 Wilmette Ave., Wilmette, Ill. 60091

[21] Appl. No.: 08/779,923

[22] Filed: Jan. 6, 1997

[51] Int. Cl.⁶ .................................................. H04L 9/00
[52] U.S. Cl. ............................ 380/24; 380/4; 380/9; 380/23; 380/25; 380/49; 705/26; 705/35; 705/39; 705/40; 705/44
[58] Field of Search .............................. 380/4, 9, 21, 49, 380/50, 59, 23, 24, 25; 705/26, 39, 40, 42, 44, 45, 35

[56] References Cited

U.S. PATENT DOCUMENTS

| | | |
|---|---|---|
| 4,277,837 | 7/1981 | Stuckert . |
| 4,302,810 | 11/1981 | Bouricius et al. .......................... 380/24 |
| 4,454,414 | 6/1984 | Benton ..................................... 235/379 |
| 4,536,647 | 8/1985 | Atalla et al. .............................. 235/379 |
| 4,614,861 | 9/1986 | Pavlov et al. ............................ 235/380 |
| 4,630,201 | 12/1986 | White . |
| 4,634,845 | 1/1987 | Hale et al. . |
| 4,689,478 | 8/1987 | Hale et al. ............................... 235/380 |
| 4,734,858 | 3/1988 | Schlafly . |
| 4,906,828 | 3/1990 | Halpern ................................... 235/379 |
| 4,977,502 | 12/1990 | Baker et al. . |
| 5,017,766 | 5/1991 | Tamada et al. . |
| 5,025,373 | 6/1991 | Keyser, Jr. et al. . |
| 5,050,207 | 9/1991 | Hitchcock . |
| 5,130,519 | 7/1992 | Bush et al. .............................. 235/380 |
| 5,157,717 | 10/1992 | Hitchcock . |
| 5,180,902 | 1/1993 | Schick et al. ............................ 235/380 |
| 5,221,838 | 6/1993 | Gutman et al. .......................... 235/379 |
| 5,265,162 | 11/1993 | Bush et al. ................................ 380/24 |
| 5,266,782 | 11/1993 | Alanärä et al. .......................... 235/380 |
| 5,347,580 | 9/1994 | Molva et al. .............................. 380/25 |

FOREIGN PATENT DOCUMENTS 85115722  10/1985  European Pat. Off. .

*Primary Examiner*—Bernarr E. Gregory
*Attorney, Agent, or Firm*—Welsh & Katz, Ltd.

[57] ABSTRACT

An apparatus and method of transferring a value from a transferor to a transferee in a transaction executed through a public service telephone network. The method includes the step of exchanging essential information between the transferor and transferee through a connection established through the public service telephone network. A summary of the transaction is transferred from the transferor and from the transferee to a third party agent of the transferee through the public service telephone network. The summary received from the transferor with the summary received from the transferee and where a match is determined, transferring the value to the transferee.

22 Claims, 4 Drawing Sheets

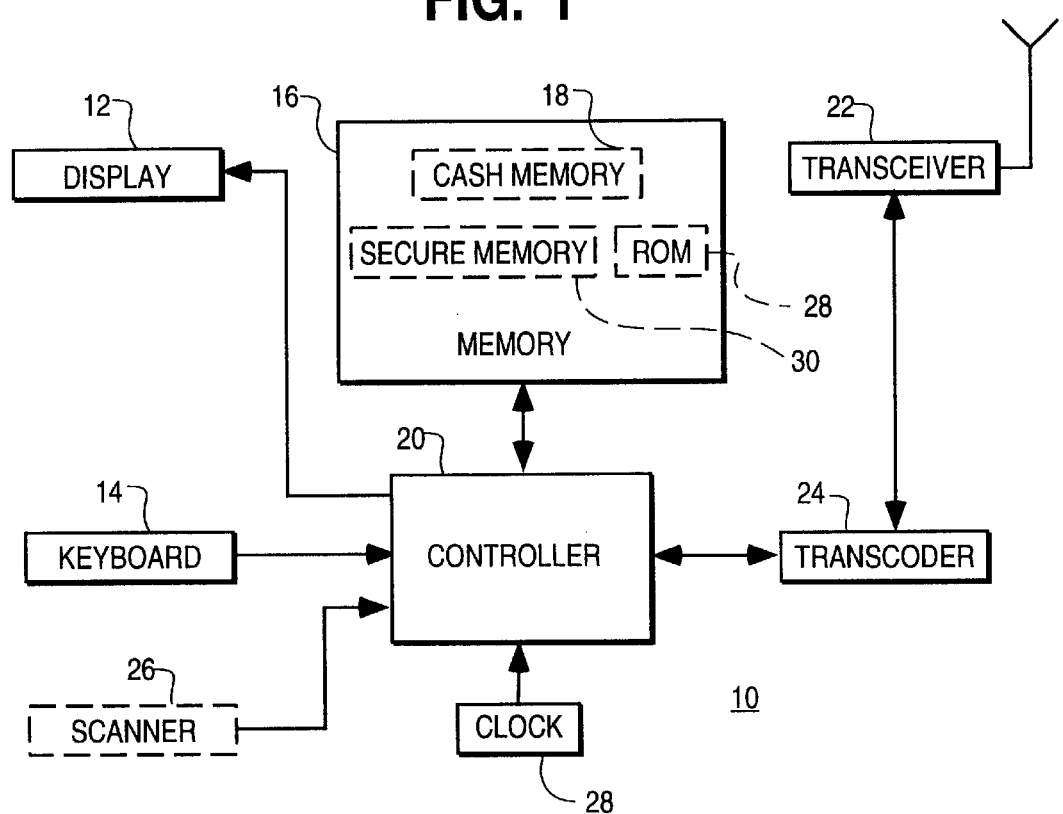
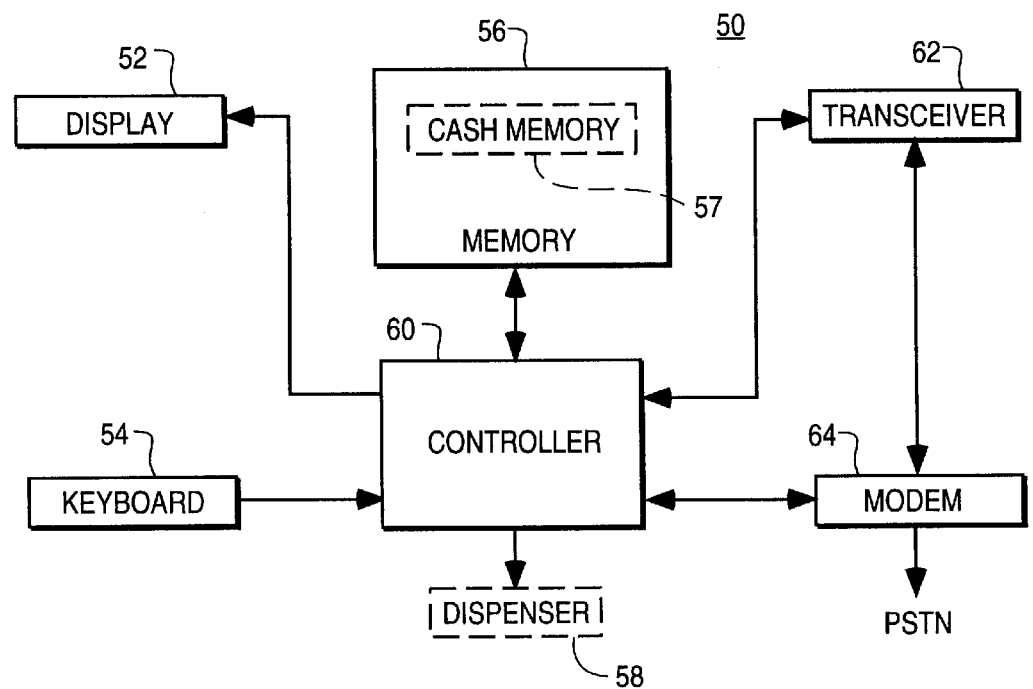

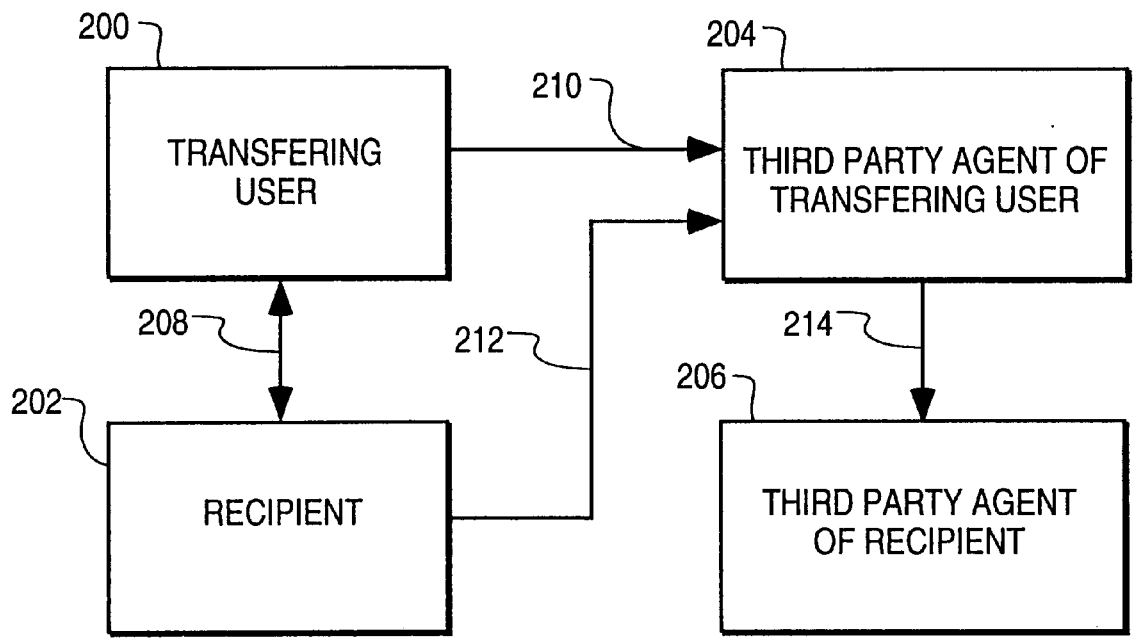
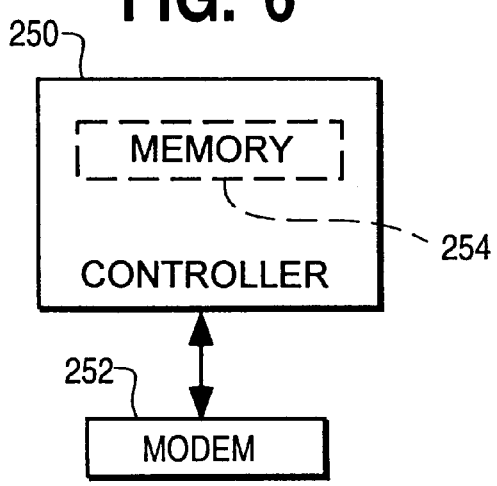

AUTOMATIC PORTABLE ACCOUNT CONTROLLER FOR REMOTELY ARRANGING FOR TRANSFER OF VALUE TO A RECIPIENT

FIELD OF THE INVENTION

The field of the invention relates to portable payment devices and more particularly to electronic devices suited to arranging credit purchases or value transfers.

BACKGROUND OF THE INVENTION

Devices for making purchases without the necessity of cash are known. Such devices range from pre-loaded debit cards (e.g., farecards on public transportation systems) to credit cards. While such devices are similar in some regards, they differ in others. The devices are similar in that they are typically constructed of plastic with a magnetic stripe on one side or the other. They differ in that a farecard is altered during use while a credit card is not.

The farecard is altered during use in that a numerical value (e.g., a dollar value or a number of bus rides) stored on the card is changed during use. Each time that the card is used a value indicative of the value of the use is subtracted from the value stored on the farecard and a new, lesser value is stored on the farecard in place of the original value.

A credit card, instead of storing a numerical suggestion of value on the magnetic stripe of the credit card, provides a promise of future payment of an incurred debt from an authorized user of the credit card. Such devices are also typically constructed of plastic with a visually readable indicia of origin (i.e., VISA, MASTERCARD, etc.) and a magnetic strip. The magnetic strip typically contains an account number of the authorized user of the card. The magnetic strip may also contain a personal identification number (PIN) of the authorized user.

To use a credit card a user simply presents the card to a vendor as an indication of a request for credit. The vendor may simply run the card through an imprinter and ask the user to sign the imprint or the vendor may, in addition, call an issuing financial institution for an authorization number. In many cases, no attempt is made to verify that the user is, in fact, an authorized user.

Where the credit card is also used as a cash station card, an additional requirement of use may be that the user enter his personal PIN number. However, since the PIN number was already present within the magnetic strip of the credit card and since a person with a card reader and the facilities to decode the magnetic strip may also be able to decode the authorized user's PIN number, the additional requirement of the entry of a PIN number is not a very effective means of preventing fraud.

Smartcards are also known. Smartcards attempt to solve the problem of storing PIN numbers on credit cards by encrypting the PIN number with other numbers such as a public key and/or a time of day and month. Further, an account number of an authorized user may also be encrypted with the same or a different public key as a further deterrent to decryption by an unauthorized user.

Upon receiving a smartcard, a cardreader of a vendor may first read an unencrypted name of an issuing credit card company followed by an encrypted account number of an account of the authorized user and PIN number. A modem interconnected with the vendor's card reader uses the unencrypted name of the issuing credit card company to establish a data link with the issuing credit card company. The modem then transmits the encrypted information to the issuing credit card company which then, using its own version of the public key, decodes the received information.

Upon decoding the received information, the issuing credit card company may authorized the transaction based upon the decoded information or may request that the credit card user enter his PIN number through an associated keyboard. If the issuing credit card company authorizes the sale, the issuing credit card company may transmit an authorization number back to the vendor's modem authorizing the sale.

If the issuing credit card company, as an additional security feature, should also request that the user enter his PIN number, the user would enter his PIN number which the issuing credit card company would then compare with the decoded PIN number and either authorize or decline the transaction. In entering his PIN number through the keyboard of the vendor (or at a cash station) the user risks disclosure of the PIN number to the vendor or nearby onlookers. If the user should forget his card upon leaving the vendor's place of business, or should be later pick-pocketed by an onlooker of the transaction, the security offered by the card may be completely compromised.

Credit cards in general have become an indispensable part of the world economy. Because of the importance of credit or other cashless transactions a need exists for a method of accomplishing such transactions without the risk of publicly disclosing confidential information such as PIN number that are otherwise used to protect credit accounts.

SUMMARY OF THE INVENTION

It is an object of this invention to provide an apparatus for making value transfers from a transferor to a transferee over the public service telephone network.

It is a further object of the invention to provide an apparatus that is inherently secure against unauthorized use.

These and other objects are provided by an apparatus and method of transferring a value from a transferor to a transferee in a transaction executed through a public service telephone network. The method includes the step of exchanging essential information between the transferor and transferee through a connection established through the public service telephone network. A summary of the transaction is transferred from the transferor and from the transferee to a third party agent of the transferee through the public service telephone network. The summary received from the transferor with the summary received from the transferee and where a match is determined, transferring the value to the transferee.

The solution to the problem of security in credit purchases lies, conceptually, in the use of a portable account controller for remotely arranging for payment of debt and for transfers of value carried by the authorized user which has the capability of encrypting information (e.g., account number, PIN number) transmitted over public communication facilities (e.g., telephone lines). The portable device, under an embodiment of the invention, is equipped with its own security features preventing use by other than an authorized user. Such security features appropriate for the portable purchasing device may require identification of a user through a retinal or fingerprint scan, or entry of a local PIN number (i.e., different from the transmitted PIN number).

Upon activation of the portable device by retinal scanning, fingerprint identification or entry of a local PIN number, the security features of the portable purchasing device may cause the portable purchasing device to remain active for a fixed time interval (e.g., one hour) or deactivate after a single purchasing transaction. If the security feature of the portable device were based upon fingerprint identification or acoustic analysis of the bone structure of a hand holding the portable purchasing device, the device may remain active for so long as the portable device were held by the authorized user. If the security feature were based upon a local PIN number or other biotic parameters of the authorized user that cannot be continuously measured (e.g., retinal scanning), then periodic reactivation would be required.

Under an embodiment of the invention, the portable purchasing device interacts with a vendor through a communication port. The communication port may be infrared (IR), radio frequency (RF), or simply a telephone jack. Upon deciding to make a purchase from a vendor, an authorized user would place the portable purchasing device in an appropriate location for exchanging information through the communication port. If the communication port were IR or RF the user may simply place the portable purchasing device in a cradle where a transceiver of the communication port of the portable purchasing device is in opposing relationship with a transceiver of a communication port of the vendor. Likewise, if the communication port were a telephone jack, the user would simply interconnect the portable purchasing device with a telephone cord of the vendor.

Upon interfacing the portable purchasing device with the communication facilities of the vendor, transfer of value for a purchase may occur under any one of a number of possible modes selectable by the user and acceptable to the vendor. At a first, and simplest level, the user of the portable purchasing device transfers value directly to the vendor in a manner similar to the transfer of electronic cash, but without the assistance of a financial institution.

Under the embodiment, to make a direct payment from cash memory, the user of the portable payment device selects "direct value transfer" from a menu on a display of the portable payment device. The user then enters an amount for direct transfer. Once the portable purchasing device is placed in a position to facilitate the exchange of information (e.g., the vendor provides a payment cradle where the port of the portable communication device is positioned proximate a communication port of a data processing system of the vendor), the portable payment device signals the vendor communication port with a "ready" prompt. When the vendor port responds, the portable purchasing device signals the mode of payment as direct transfer. The vendor communication port transfers the mode of payment to the vendor data processing system (herein referred to as an electronic cashbox) which then queries the vendor through the vendor's local display whether direct payment is acceptable. If the vendor enters a favorable response (e.g., "Y" or simply presses ENTER) at a keyboard of the vendor's electronic cashbox, the vendor's communication port signals the portable purchasing device that the transaction has been accepted and the transaction is completed.

Direct payment may also occur where the user places his portable purchasing device upon a payment cradle and the vendor transmits a price to the portable purchasing device. The user may press an "OK" key (e.g., enter) transferring payment to the vendor or the user could add a percentage to the total (e.g., a tip) before authorizing payment.

Alternatively, the user of the portable purchasing device may decide to pay by credit or may pay by transferring cash from a financial institution account of the authorized user to a financial institution account of the vendor. In either case the user places the portable purchasing device in a purchasing cradle and the portable purchasing device arranges payment through the communication facilities (e.g., telephone lines) of the vendor. The portable purchasing device accomplishes such mode of payment by first passing an access code (e.g., a telephone number, web site identifier, e-mail address, Internet address, etc.) of the user's financial institution or credit source to the vendor's payment receipt system.

Upon receiving the telephone number the vendor's system may first check that the telephone number is that of a financial institution recognized as a good credit risk by the vendor before accepting payment from such institution. Upon completing such checks, the vendor's system passes the telephone number to the local public switch telephone network (PSTN) for connection to the selected financial institution. Following completion of the connection with the selected institution, the vendor's system and portable purchasing device monitor the connection for transmissions and respond as appropriate to the selected mode of payment.

Whatever the selected mode of payment, the portable purchasing device must first uniquely identify itself to the selected financial institution (i.e., a financial institution or the vendor's house account) before the transaction may be completed. However, since the vendor is monitoring the connection, steps must be taken to ensure the security of access to the authorized user's financial institution accounts.

The portable purchasing device may do this by first transmitting an identifier (e.g., a social security number, account number, etc.) of the authorized user. Once the authorized user has been identified to the financial institution, the financial institution may use such identification to access a file of the authorized user for a set of encryption keys to decode subsequent transmissions from the portable purchasing device. The portable purchasing device using an identical set of encryption keys encodes further indicia of identity (e.g., a PIN number) for transmission to the financial institution which may only be decoded by the financial institution. The portable purchasing device may also encode other information (i.e., mode of payment to the vendor and payment amount) transmitted to the financial institution. The financial institution, upon decoding the transmission, responds in the clear (i.e., no encryption) with an acceptance or rejection message (or with a request for re-transmission if an error occurred).

The vendor's system, monitoring the connection, receives the acceptance message, and transmits an appropriate response. If the transaction were a credit purchase the vendor's system may transmit a merchant number, amount of purchase, and a request for a credit authorization number. If the purchase involved a cash transfer to a vendor financial institution account, the vendor may respond with indicia of identity of the vendor's financial institution and financial institution account number along with an expected amount of the transfer. The authorized user's financial institution, upon receiving the response from the vendor, compares the amount of purchase transmitted by the portable purchasing device to the expected amount from the vendor and, if the amounts match, completes the transaction.

Further objects, features and advantages of the present invention will become apparent from the following detailed description of the invention taken in conjunction with the accompanying drawings wherein like reference numerals designate like elements throughout the several views.

BRIEF DESCRIPTION OF THE DRAWINGS

FIG. 1 is a block diagram of a portable purchasing device in accordance with a preferred embodiment of the present invention;

FIG. 2 is a block diagram of a vendor cashbox for use with the portable purchasing device of FIG. 1;

FIG. 5 is a block diagram of a system using the device of FIG. 1 under an alternate embodiment; and FIG. 6 is a block diagram of the third party agent of FIG. 5.

DESCRIPTION OF A PREFERRED EMBODIMENT

Figure 3:
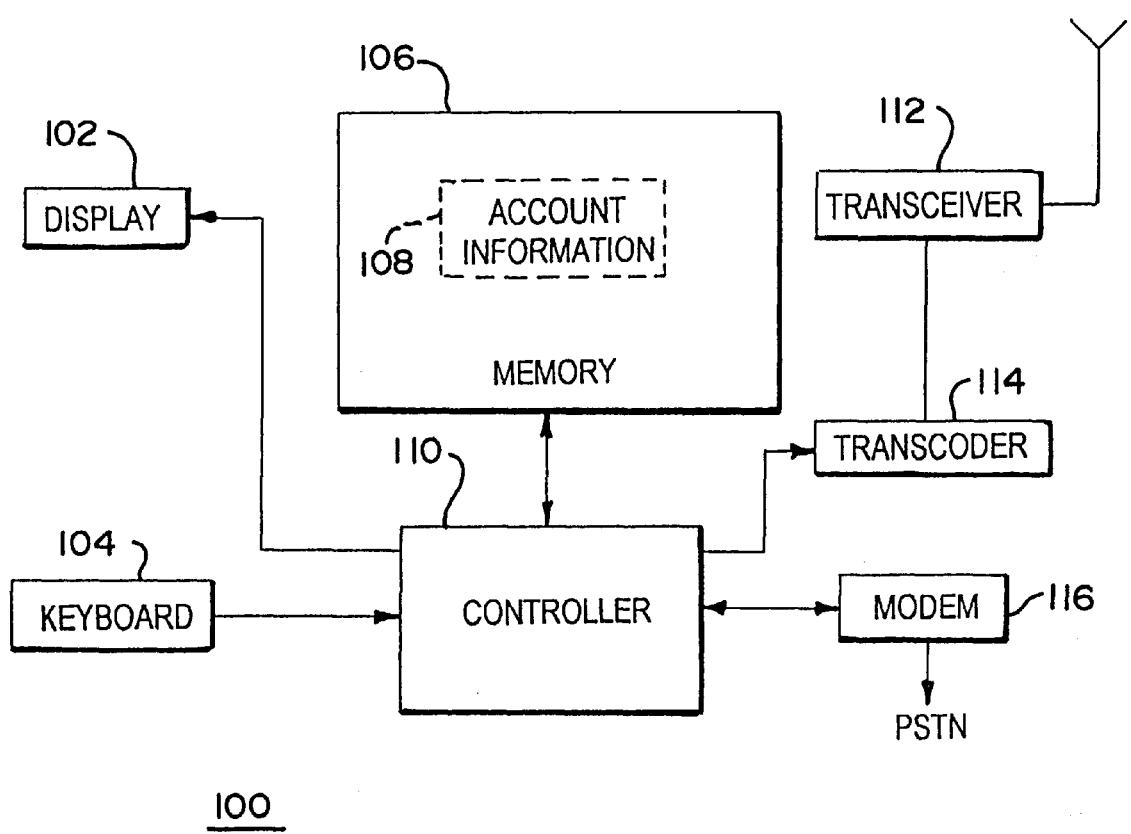
FIG. 3 is a block diagram of a system for programming a cash memory of the portable purchasing device of FIG. 1.

FIG. 1 is a block diagram of a portable purchasing device 10, in general. A controller 20 receives input information from a keyboard 14 (or optional scanner 26) and displays information on display 1portable purchasintions for the portable purchasing device 10 are stored within a memory 16 and loaded into the controller 20 upon activation. The portable purchasing device 10 interacts with external devices through a transcoder 24 and transceiver 22.

The transceiver 22 may exchange information in the IR range or in the visible range through use of an appropriate light emitting diode (LED) and photodetector. The transceiver may also operate in the RF range using amplitude modulation (AM), frequency modulation (FM), quadrature amplitude modulation (QAM), or any other appropriate modulation technique. The transceiver 22 may also interact with external devices directly through modem and telephone jack.

Figure 4:
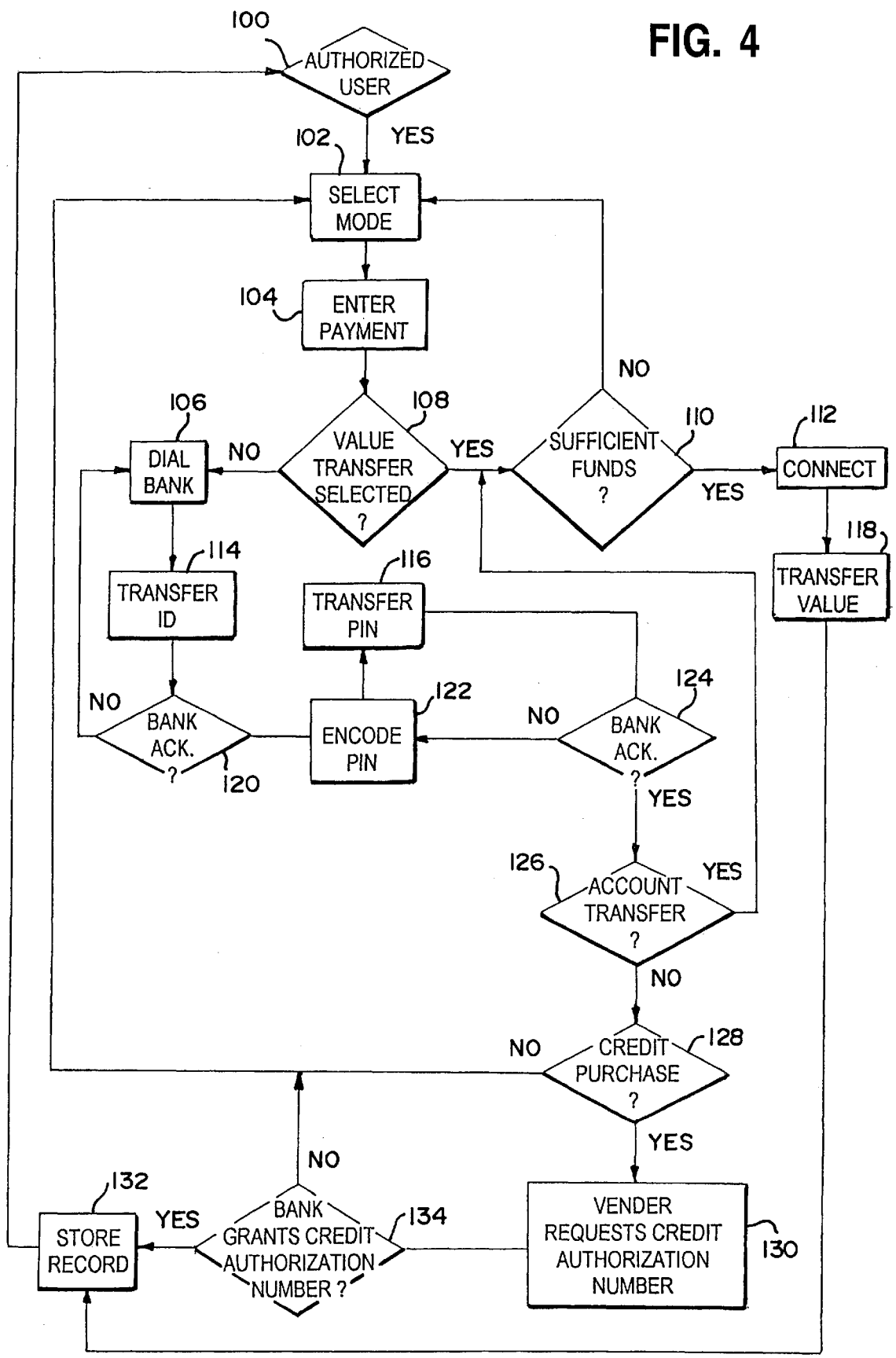
FIG. 4 is a flow chart of the steps of operation of the portable purchasing device of FIG. 1.

The portable purchasing device 10 under an embodiment of the invention is typically programmed under the auspices of an issuing financial institution for the benefit of its customers. FIG. 4 is a flow chart showing, in summary form, the program steps of a portable purchasing device 10 under an embodiment of the invention. Reference will be made to FIG. 4 as appropriate to an understanding of the invention.

As part of the programming of the portable purchasing device 10 the issuing financial institution may enter a numerical value in a cash memory 18 of the memory 16 of the portable purchasing device 10. The numerical value represents a cash value that the authorized user of the portable purchasing device has received from the issuing financial institution, and which the financial institution has stored in the portable purchasing device for purposes of making direct value transfers to vendors. The cash memory area of the memory 16 is not accessible to a user except for withdrawals. The cash memory 18 is protected by a set of passwords known only to the financial institution. Additions to the value stored in cash memory 18 must be performed under the control of a financial institution or other authorized institution (which act as a guarantor of the value originally stored within the portable purchasing device 10) and which possesses the passwords that allow access to a store algorithm used by the portable payment device.

Electronic cash transactions may be limited to some maximum value (e.g., $100.00) and may be used primarily to pay debts where verification of credit worthiness is not practical (e.g., payment of bus fare, purchasing a newspaper, etc.). Electronic cash is also used where the context of the transaction requires that payment be made as quickly as possible.

Stored with the cash value in the portable purchasing device 10 is an identifier of the financial institution storing the most recent cash deposit to the portable purchasing device as well as any previously storing financial institutions and electronic cash remaining from the previous deposit. Also stored within cash memory to provide an audit trail of proper operation of the portable purchasing device 10 is a summary of the most recent deposit to cash memory as well as identifiers of vendors to which dispersements were made and the dates of such dispersements.

Also entered into a secure area 30 of memory 16 is a telephone number of the issuing financial institution as well as numbers of various financial institution accounts of the authorized user. A set of encryption keys are also stored within secure memory 30. The encryption keys may be any non-repeating number sequence (e.g., a public key).

The program under which the portable purchasing device 10 operates is loaded into a read only memory (ROM) 28 of the portable purchasing device 10 during manufacture by methods well known in the art. The program (FIG. 4) may be activated by pressing any key on the keyboard 14 of the portable purchasing device 10. Following activation of any key the portable purchasing device 10 enters a program step 100 where the portable purchasing device waits a time period (e.g., 30 seconds) for entry of indicia of an authorized user. If the portable purchasing device 10 does not receive the proper indicia of the authorized user within the 30 seconds (or if the entered indicia is incorrect) the device 10 again deactivates.

The indicia of the authorized user may be any alphanumeric or biotic parameter capable of input through the keyboard 14 or optional scanner 26 and a summary of which may be stored within memory 16. The indicia of the authorized user may be a local PIN number of may be the same PIN number that is later encoded and transmitted to an issuing financial institution.

Where the indicia of the authorized user is entered through the scanner 26, the indicia may be a fingerprint of the authorized user or where the scanner 26 is a retinal scanner the indicia may be the image of the authorized user's retina. Where the scanner 26 is an acoustic scanner, distinguishable differences in the bone structure of the authorized user's hand may be scanned and stored as the indicia of the authorized user.

Following activation, the portable purchasing device 10 waits for the user to select 102 a mode of payment. The possible modes of payment may be displayed on the display 12 in the form of a menu. Mode selection 102 may be accomplished by entering a numerical value displayed beside a menu item, or where a touch-screen is used for the display 12, the selection may be accomplished by the user touching an appropriate part of the menu on display 12.

Following mode selection 102, the portable purchasing device 10 wait for entry of a purchase amount. The purchase amount is typically entered as a dollar value through the keyboard 14 or through a touch-screen display 14 by touching appropriate symbols on the display 14.

Following entry of a dollar value a controller 20 executes the selected payment. As a first step, the controller checks whether a direct value transfer has been selected 108. If so, the controller verifies 110 that a sufficient balance remains within cash memory 18 for payment of the debt.

If a sufficient balance remains within cash memory 18, the controller 20 causes a connect tone to be transmitted by transceiver 22. The connect tone transmitted by the transceiver 22 of the portable purchasing device 10 is detected by a transceiver 62 of the vendor's electronic cashbox 50 and transferred to a controller 60 of the cashbox 50. The controller 60, upon detecting the connect tone, responds with an acknowledge.

The portable purchasing device 10 upon receiving the connect tone transmits a serial number of the portable purchasing device 10 as well as an entered payment value. The serial number of the portable purchasing device 10 contains, embedded within, a serial number of the issuing financial institution as well as a sequence number uniquely identifying the portable purchasing device 10. The vendor's cashbox 50 first checks by reference to memory 56 whether the issuing financial institution is in good standing with the vendor as far as honoring direct value transfers. The vendor then checks that the portable purchasing device is an appropriate model compatible with the cashbox 50 and that the payment amount is of a proper value.

If the vendor cashbox 50 finds the transaction acceptable, the cashbox 50 transmits, through the transceiver 62, a proceed command to the portable purchasing device 10 that contains a unique identifier of the cashbox 50. The portable purchasing device 10 responds by executing a value transfer 112 by transmitting a transaction number to the cashbox 50 which may be a combination of the identifier of the portable purchasing device 10, the identifier of the cashbox 50 and a numerical value of the transaction as well as certain other encrypted digits that may be used for transaction certification. The encrypted digits may be a combination of the identifiers of both portable purchasing device 10, cashbox 50, the time and date of the transaction, and the amount of the transaction all encrypted through use of a public key known only to the issuing financial institution and portable purchasing device 10.

The vendor's electronic cashbox 50 upon receipt of a transaction number of a direct value transfer stores the transaction number in a cash transfer file 57 of a memory of the electronic cashbox 50 for later redemption. Redemption of direct value transfers are periodically done at the vendor's convenience. The vendor may redeem direct transfers by transmitting a summary of all transaction numbers to the vendor's financial institution through the cashbox controller 60, modem 64 and PSTN, or the vendor may simply download the transaction numbers to a floppy disk and take such floppy disk to the vendor's financial institution with the vendor's other daily receipts or the vendor may transfer such information from his memory device (e.g., a hard disk) to the financial institutions memory device (e.g., another hard disk) through an appropriate data transfer (i.e., downloading between disk drives).

The vendor's financial institution upon receiving the summary of transaction numbers, first retrieves an identifier of the financial institution issuing the portable purchasing device 10, and a purchase amount, from the transaction number. The vendor's financial institution may then transmit a summary of charges to the issuing financial institution for credit to the vendor's account. The issuing financial institution may immediately issue a credit or wait until the portable purchasing device 10 downloads its summary of purchases for comparison with transaction numbers received from vendor's financial institutions.

If the summary from the portable purchasing device 10 contains a purchase record that matches a charge from a particular vendor then the vendor's account is credited. If the summary does not match, then the issuing financial institution requests a full copy of the transaction number including the encrypted digits for transaction certification. The issuing financial institution decodes the encrypted digits to verify that the request for credit is legitimate. If the request is legitimate (as determined by the content of the decoded digits within the transaction number) the issuing financial institution credits the vendor's account.

Encryption and decryption in accordance with an embodiment of the invention may be accomplished under any of a number of well known standards. For example the data encryption standard (DES) may be used. DES works by breaking messages into discrete blocks of information (usually 8 characters having 64 bits) and transforming them into blocks of ciphertext according to a 56 bit "key".

Decryption (decoding) requires that the same key by used for converting the ciphertext back into the original message. Before storing a transaction number a portable purchasing device can encrypt a message using a key known solely to the portable purchasing device 10 and the issuing financial institution for which the encrypted bits are intended. Theft of the transaction numbers would do a thief no good, because without the key the encrypted bits of the transaction number are digital gibberish.

If the mode of payment entered into the portable purchasing device 10 is not direct value transfer, then the portable purchasing device 10 next transfers a telephone number of the authorized user's financial institution to the vendor. The vendor checks the authenticity of the telephone number before transferring the number to the PSTN. When a connection is established through the PSTN with a financial institution of the authorized user and the vendor, the financial institution transmits a connect tone and the vendor adds the portable purchasing device to the connection with the financial institution through the PSTN. The portable purchasing device 10 responds by transmitting an identifier 114 which identifies the authorized user to the financial institution. The identifier may be a customer number, a social security number, a financial institution account number, a combination of such numbers, or some other appropriate identifier number. Upon receiving the identifier, the financial institution responds 120 with an acknowledge. If the financial institution does not respond with an acknowledge within a reasonable time (e.g., one second) the portable purchasing device 10 re-dials the financial institution and tries again.

Upon receiving an acknowledge 120 from the financial institution, the portable purchasing device 10 encrypts and sends a security number and payment value. Where the identifier transmitted to the financial institution is a financial institution customer number or social security number of the authorized user, then the encrypted security number would be a financial institution account number. Where the identifier is an account number then the encrypted security number is a PIN number. Where an authorized user has multiple accounts with a financial institution then the user would want to use an identifier comprising a customer number or social security number as an identifier and an account number as the security number. In such a case the authorized user's PIN number would become an alternate security number providing additional levels of security against fraud.

The identifier transmitted to the financial institution allows the financial institution to access an encryption file of the authorized user of the portable purchasing device 10. Contained within the encryption file are identifiers of public key encryption codes that are also stored within secure memory 30 of the portable purchasing device 10 and which are used by the portable purchasing device 10 to encrypt the security number(s). Encryption in accordance with an embodiment of the invention is performed under processes that are well known in the art within the transcoder 24.

Upon identification of the authorized user and receipt of the encrypted security number, the financial institution uses the encryption keys of the authorized user to decode the security number and payment amount. (Decoding of the encrypted information is also performed using methods well known in the art.) Following decoding, the financial institution acknowledges 124 successful decoding of the security number by transmitting a security code acknowledge message. Using the security number, the financial institution then determines whether the user account number is a cash account or a credit account. If the account is a cash account, the financial institution verifies 110 that the authorized user has sufficient funds to cover the payment amount and, if so, transmits a request to the vendor cashbox 50 for an identity of a target account into which to transfer the payment. The vendor cashbox 50 responds with a indicia of a vendor account designated to receive payments (e.g., wire transfer number or financial institution and financial institution account number). Upon receipt of the indicia of the vendor's account, the user's financial institution executes the transfer. A transfer receipt may be returned to the vendor cashbox 50 and stored for later verification of the transfer and as a tracking tool should be transfer be ineffective. The transfer receipt and record of the transaction is also stored 132 by the portable purchasing device 10.

If, upon examining the decoded account number from the portable purchasing device 10, the user's financial institution determines that the account is a credit account, the financial institution first determines whether any payments are overdue on the account or if the account is over the credit limit. If so, the user's financial institution may decline 122 the purchase and request that the portable purchasing device 10 choose another mode of payment.

If the credit account is up-to-date, then the user's financial institution transmits a "purchase accepted" message back to the vendor's cashbox 50. The vendor's cashbox may then transmit 130 a request for a credit authorization number. The user's financial institution responds 134 with a credit authorization number, which number is stored by both the vendor's cashbox 50 and the portable purchasing device 10. In addition, the portable purchasing device 10 creates a record of the transaction including time and date and the amount of the transaction.

If the vendor is a cash dispensing station, then the procedure is quite similar, except for the manner of interfacing with the cash dispensing station. Since most cash dispensing stations require that a credit or cash card be inserted into a slot, a cash dispensing station designed to operate in conjunction with the portable purchasing device 10 is modified to include a transceiver or phone jack.

Under the invention, the modified cash station has a similar structure to that shown in FIG. 2 wherein the dispenser 58 is, in this case, a cash dispenser. Under the invention and to interface with a cash dispensing station, the portable purchasing device 10 may operate under either of two modes. Under the first mode, the portable purchasing device 10 transfers an account number, a PIN number, and a cash request value to a controller of the cash dispensing station 50 through the transceiver 62. Under the first mode, the controller 60 of the cash dispensing station 50 functions as if the account number had been received from a card reader (used in place of the transceiver 62) and the PIN number and cash advance value were entered through the keyboard 54 (instead of the transceiver 62) all consistent with operation under the prior art. The controller 60 of the cash dispensing station 50 transfers the user information through a local area network (LAN) including the modem 64 and PSTN lines to a controlling financial institution (not shown) which then processes the information as under the prior art. The controlling financial institution, through its own data processing network, interfaces with a financial institution of the authorized user to arrange for account transfers or charge account debits consistent with prior art practices. Upon validating the request from the cash dispensing station 50 the controlling financial institution (again through the LAN) instructs the controller 60 to dispense the requested cash through the cash dispenser 58.

Under the second mode of operation, the cash dispensing station 50 operates as a stand-alone device, without the need for a controlling financial institution. The cash dispensing station relies on account transfers into its own financial institution account from the financial institution of the authorized user for protection against fraud. The cash transfers may be from a cash account of the authorized user or may be from a credit extending financial institution of the authorized user.

Under the second mode, the portable purchasing device interacts with the cash dispensing station 50 as previously described for a vendor accepting cash transfers. The portable purchasing device 10 transfers a telephone number of a user financial institution to the cash vending station 50, the cash vending station 50 verifies the number before establishing a connection with the user financial institution, and the portable purchasing device transfers appropriate account and security numbers to cause the user financial institution to perform an account transfer to a financial institution account of the cash vending station 50. A verification message of such account transfer causes the cash vending station 50 to dispense cash as requested.

In another embodiment of the invention, an apparatus 100 (FIG.3) is provided under the control of a user's financial institution for adding value to the cash memory 18 of the portable purchasing device 10. Under the embodiment, the portable purchasing device 10 is placed in a transfer cradle (not shown) at the user's financial institution and the system 100 activated. The system 100 establishes itself as system manager of the portable purchasing device 10 by transmitting identifying passwords through a transceiver 112 of the user's financial institution to the transceiver 22 of the portable purchasing device 10. Upon establishing itself as system manager, the system 100 of the user's financial institution may download from cash memory 18 to the financial institution a prior history of all value transfers that have previously been made from the portable purchasing device 10 to vendor cashboxes 50. The system 100 may also transfer additional cash value from a financial institution account 108 of the authorized user to the cash memory 18 of the portable purchasing device 10.

In another embodiment of the invention, the memory 16 of the portable purchasing device 10 may contain a digitized picture of the authorized user. Under the embodiment, the controller 20 retrieves the picture from memory 16 and transfers the picture to a CRT display 52 of the vendor's cashbox before the vendor accepts payment for the purchase. Display of a picture of the authorized user, in advance of purchase, further alerts a vendor to potential fraud in the use of cashless purchasing devices.

In another embodiment of the invention, the transaction number transferred from the portable purchasing device 10 to a vendor's cashbox 50 contain additional encrypted bits that may be decoded by the controller 60 the vendor's cashbox 50. The additional bits are encrypted under a key known to both portable purchasing device 10 and to the vendor's cashbox 50. The additional bits are encoded by the portable purchasing device 10 with a time and a date of the purchase as a deterrent to copying of data transmissions and as a means of preventing the fraudulent use of a data recording devices for purchasing purposes.

In another embodiment of the invention, the portable account controller 10 of FIG. 1 is incorporated into and made a part of a cellular telephone 22. Such an arrangement is useful where a transfer is to be made from the transferring user to a recipient and does not occur on a face-to-face basis.

The recipient could be a private individual and the value transfer could be for future services or in settlement of a past debt. The recipient could also be a public utility (e.g., a gas or electric utility, phone company, etc.) receiving payment of utility bills.

Under the embodiment, a user places a call to a recipient (also having a portable account controller 10) through the PSTN to arrange for transfer of value to the recipient. Arranging for transfer of value in this context means exchanging essential information about the transaction. Following the exchange of essential information, the portable account controller 10 of each party to the transaction independently and automatically prepares and sends a summary file of the transaction to the third party clearing agent of the transferring party. The third party clearing agent accomplishes transfer of value to the recipient based upon a matching and authentification of summaries of the transaction from both recipient and transferring user.

The source of the value transferred from the third party clearing agent may be a money market fund, or some other demand account under the control of an agent of the transferring user. As used herein and for purposes of explanation, the third party clearing agent can be assumed to be a computer executing specific programming instructions.

To accomplish a value transfer, either a transferring user or a recipient may initiate a call. The call may be initiated by the entry of a set of dialed digits into a keypad 14 of the portable account controller 10. Entry of the dialed digits results in a connection 208 through the PSTN between the transferring party 200 and recipient 202. When the other party answers, a discussion may follow or the transferring user may simply verbally state his purpose of arranging a transfer.

To initiate a transfer, the transferring user 200 enters a transfer value through a keyboard 14 of his portable account controller 10 and presses enter, or a "transfer setup" button on the keyboard 14. As a result, the controller 20 of the portable account controller 10 composes a message for transmission to the recipient 202 through the PSTN connection 208. The message is transmitted through the PSTN connection 208 between the transferring user 200 and recipient 202 via a modem 30 built into the cellular phone 22 inside each portable account controller 10.

The message transmitted to the recipient would include a transfer value as well as an identifier of the transferring user 200 and identifier (e.g., telephone number) of the third party agent 204 of the transferring user 200. The message may also include a time of the transfer from a clock 28, as well as a randomly generated transaction identification number.

Upon receiving the message, the portable account controller 10 of the recipient 202 displays the proposed transfer value on a display 12 of the portable account controller 10. If the recipient finds the transfer value acceptable, he may press enter or press a "transaction accepted" button on his keyboard 14. On accepting the transaction, the controller 20 of the recipient 202 composes and transmits a response back to the transferring user. The controller 20 of the recipient 202 also stores the message from the transferring user 200 in memory 16.

The response sent from the recipient 202 back to the transferring user 200 may include an identifier of the recipient 202 and indication that the transaction has been accepted. The response may also include a time that the response was accepted by the recipient 202.

Upon receiving indication that the transaction has been accepted, the transferring user 200 may press enter or a button labeled "execute transaction" on the keyboard 14 on his portable account controller 10. An acknowledge may be sent back over the connection 208, at which time the connection 208 is terminated by the controllers 20 at each end.

Upon terminating the connection 208, the portable account controller 10 of the transferring user 200 and of the recipient 202 creates a transaction summary file for transmission to the third party agent 204 of the transferring user 200. The summary file of the transferring user 200 includes a transfer value, an identifier of the recipient 202 and a time of the transaction. The summary file may also include the randomly generated transaction identifier.

Upon completing the summary file, the controller 20 of the transferring user 200 transfers a telephone number of the third party agent 204 to the modem of the cellular telephone 22 and sets up a connection 210 between the transferring user 200 and the third party agent 204. When the third party agent 204 (FIG. 6) answers the call, the transferring user transfers an identifier to the third party agent 204 identifying the transferring user 200 to the third party agent. The identifier may be a telephone number of the transferring user 200 or it may be an account number of the transferring user 200 used by the third party agent 204 to identify the transferring user 200.

Upon identifying itself to the third party agent 204, the transferring user 200 is now in a position to transfer the summary file. However, to prevent unauthorized transfers, the transferring user 200 now takes certain steps to prevent unauthorized use of his transfer account. As a first step, the transferring user 200 may retrieve a password from secure memory 30. The transferring user 200 may also encrypt the password and summary file before transmission to the third party agent 204. The encryption method may include public or private key encryption and/or symmetric or asymmetric encryption techniques.

The third party agent 204 uses the previously transmitted identifier of the transferring party 200 to access a secure file maintained for the transferor 200 within a memory 254 of the third party agent 204. Contained within the secure file is decryption information (i.e., a decryption key) of the transferring user 200. The third party agent 204 uses the decryption information to decode the password and summary file from the transferring user 200.

If the password matches the password within the secure file of memory 254 for the transferring user 200, the third party agent 204 places the summary information in a pending transfer file. The third party agent 204 cannot yet make a transfer until it receives a similar summary file from the recipient 202.

The summary file created by the recipient 202 for transfer to the third party agent 204 is similar to the summary file from the transferring user 200 in all but a few respects. First, since the recipient probably may not have an account with the third party agent 204, encryption techniques may not be appropriate. Second, the recipient 202 must send an identifier of a destination for the value transfer. The destination of the value transfer may be a third party agent 206 of the recipient 202.

Alternatively, the transferring user 200 and recipient may use the same third party agent 204. In such a case, it can be assumed that both the transferring user 200 and recipient maintain accounts with the third party agent 204. Where the transferring user 200 and recipient use the same third party agent 204, the recipient may also encrypt the summary file. As with the transferring user 200, the recipient 202 may preface a transmission with an account identifier. The account identifier may allow the third party agent 204 to access a secure file created within a memory 254 of the third party 204 to retrieve a decryption key for the recipient 202.

Upon completing creation of the summary file, the recipient also initiates a connection 212 with the third party agent 204. The recipient first identifies itself as a recipient of a transfer before sending the summary file. Since the summary file of the recipient 202 would include identifiers of both transferring user 200 and recipient 202, the third party agent 204 can easily match the summary file of the recipient 202 with the summary file of the transferring user 200. If the contents of the summary files match, a transfer is authorized. Specific summary file items compared may include identifiers of both transferring user 200 and recipient 202, times of the transaction, transfer value and a transaction number, if any.

Upon determining a match in summary files, the controller 250 of the third party agent 204 of the transferring user 200 authorizes a transfer. Since the recipient 202 of the transfer included an identifier of the destination of the transfer along with the summary file (e.g., a third party agent 206 of the recipient 202), a transfer can now be executed. The transfer can be accomplished using wire transfer, or otherwise.

In another embodiment of the invention, the transferring user 200 and recipient may exchange essential information on a face-to-face basis using an IR or RF transceiver 112 of FIG. 3 or interconnecting plugs. Transfer of summary files may occur subsequently through a physical connection with the PSTN through a modem 116. The transferring user 200 and recipient 202 may make parallel connection with the third party agent 204 through parallel connections 210, 212 or the transfer of summary files may occur sequentially over the same PSTN connection.

While a specific embodiment of an apparatus for remotely arranging for payment of debt to a vendor, and its manner of operation, have been illustrated and described, it should be understood that variations and modifications of the invention in its various aspects will be apparent to those skilled in the art, and that the invention is not limited by the specific embodiments described. It is therefore contemplated to cover by the present invention any modifications, variations, or equivalents that fall within the true spirit and scope of the basic underlying principles disclosed and claimed herein.

What is claimed is:

1. A method of transferring a value from a transferor to a transferee in a transaction executed through a public service telephone network, such method comprising the steps of:
   exchanging essential information between the transferor and transferee;
   transferring a summary of the transaction from the transferor and from the transferee to a third party agent of the transferee along separate parallel paths through the public service telephone network;
   comparing identifiers of summaries received by the third party agent to match the summary of the transferor with the summary of the transferee; and
   comparing a substantive content of the summary received from the transferor with a substantive content of the summary received from the transferee and where a match is determined, transferring the value to the transferee.

2. The method of transferring a value as in claim 1 wherein the steps of exchanging essential information further comprises establishing a telephone connection through the public service telephone network.

3. The method of transferring a value as in claim 2 further comprising transferring the value to the transfer destination of the transferee from the third party agent.

4. The method of transferring a value as in claim 1 further comprising transferring an identifier of a transfer destination of the transferred value from the transferee to third party agent.

5. The method of transferring a value as in claim 1 wherein the step of exchanging essential information further comprises exchanging an identifier of the transferor and transferee.

6. The method of transferring a value as in claim 5 wherein the step of transferring a proposed transfer value further comprising transferring an acceptance from the transferee to the transferor.

7. The method of transferring a value as in claim 1 wherein the step of exchanging essential information further comprising transferring a proposed transfer value from the transferor to the transferee.

8. The method of transferring a value as in claim 1 wherein the step of exchanging essential information further comprises transferring a transaction identifier from the transferor to the transferee.

9. The method of transferring a value as in claim 8 wherein the step of transferring the encrypted summary of the transaction from the transferor to the third party agent further comprising recovering a decryption key from a secure file maintained by the third party agent for the transferor.

10. The method of transferring a value as in claim 1 wherein the step of transferring a summary of the transaction from the transferor to the third party agent further comprises encrypting the summary.

11. The method of transferring a value as in claim 1 wherein the step of recovering the decryption key further comprising decrytpting the summary from the transferor.

12. Apparatus for transferring a value from a transferor to a transferee in a transaction executed through a public service telephone network, such apparatus comprising:
   means for exchanging essential information between the transferor and transferee;
   means for transferring a summary of the transaction from the transferor and from the transferee to a third party agent of the transferee along separate parallel paths through the public service telephone network;
   means for comparing identifiers of summaries received by the third party agent to match the summary of the transferor with the summary of the transferee; and
   means for comparing a content of the summary received from the transferor with a content of the summary received from the transferee and where a match is determined, transferring the value to the transferee.

13. The apparatus for transferring a value as in claim 12 further comprising means for transferring an identifier of a transfer destination of the transferred value from the transferee to third party agent.

14. The apparatus for transferring a value as in claim 12 further comprising means for transferring the value to the transfer destination of the transferee from the third party agent.

15. The apparatus for transferring a value as in claim 12 wherein the means for exchanging essential information further comprises means for exchanging an identifier of the transferor and transferee.

16. The apparatus for transferring a value as in claim 15 wherein the means for transferring a proposed transfer value further comprising means for transferring an acceptance from the transferee to the transferor.

17. The apparatus for transferring a value as in claim 12 wherein the means for exchanging essential information further comprising means for transferring a proposed transfer value from the transferor to the transferee.

18. The apparatus for transferring a value as in claim 12 wherein the means for exchanging essential information further comprises means for transferring a transaction identifier from the transferor to the transferee.

19. The apparatus for transferring a value as in claim 18 wherein the means for transferring the encrypted summary of the transaction from the transferor to the third party agent further comprising means for recovering a decryption key from a secure file maintained by the third party agent for the transferor.

20. The apparatus for transferring a value as in claim 12 wherein the means for transferring a summary of the transaction from the transferor to the third party agent further comprises means for encrypting the summary.

21. The apparatus for transferring a value as in claim 12 wherein the means for recovering the decryption key further comprising means for decrytpting the summary from the transferor.

22. Apparatus for transferring a value from a transferor to a transferee in a transaction executed through a public service telephone network, such apparatus comprising:

a connection between the transferor and transferee for exchanging essential information between the transferor and transferee;

a first modem for transferring a summary of the transaction from the transferor to a third party agent of the transferee through the public service telephone network;

a second modem for transferring a summary of the transaction from the transferee to the third party agent of the transferee through a separate parallel connection through the public service telephone network;

a first comparator for comparing identifiers of summaries received by the third party agent to match the summary of the transferor with the summary of the transferee; and a second comparator for comparing a content of the summary received from the transferor with the content of the summary received from the transferee and where a match is determined, transferring the value to the transferee.

* * * * *